(12) United States Patent
Scavo et al.

(10) Patent No.: US 11,912,377 B2
(45) Date of Patent: *Feb. 27, 2024

(54) USING PLASTIC TO CREATE A FLOATING PLATFORM

(71) Applicants: Damian Scavo, Menlo Park, CA (US); Patrizio Paoletti, Rome (IT)

(72) Inventors: Damian Scavo, Menlo Park, CA (US); Patrizio Paoletti, Rome (IT)

(*) Notice: Subject to any disclaimer, the term of this patent is extended or adjusted under 35 U.S.C. 154(b) by 0 days.

This patent is subject to a terminal disclaimer.

(21) Appl. No.: 17/948,009

(22) Filed: Sep. 19, 2022

(65) Prior Publication Data

US 2023/0008812 A1    Jan. 12, 2023

Related U.S. Application Data

(63) Continuation of application No. 16/997,620, filed on Aug. 19, 2020, now Pat. No. 11,447,214.

(60) Provisional application No. 62/890,261, filed on Aug. 22, 2019.

(51) Int. Cl.
| | |
|---|---|
| B63B 35/44 | (2006.01) |
| B63B 75/00 | (2020.01) |
| B63B 79/40 | (2020.01) |
| B29B 17/00 | (2006.01) |
| A01G 9/14 | (2006.01) |
| B29K 105/26 | (2006.01) |

(52) U.S. Cl.
CPC ............ *B63B 35/44* (2013.01); *A01G 9/1407* (2013.01); *B29B 17/0047* (2013.01); *B63B 75/00* (2020.01); *B63B 79/40* (2020.01); *B29B 2017/0031* (2013.01); *B29K 2105/26* (2013.01); *B63B 2035/4453* (2013.01); *B63B 2035/4466* (2013.01); *B63B 2221/00* (2013.01); *B63B 2231/40* (2013.01); *B63B 2241/08* (2013.01)

(58) Field of Classification Search
CPC ......... B63B 35/44; B63B 75/00; B63B 79/40; B63B 2035/4453; B63B 2035/4466; B63B 2231/40; B63B 2221/00; B63B 2241/08; A01G 9/1407; B29B 17/0047; B29B 2017/0031; B29B 17/1407; B29K 2105/26

See application file for complete search history.

(56) References Cited

U.S. PATENT DOCUMENTS

| | | | |
|---|---|---|---|
| 11,447,214 | B2 | 9/2022 | Scavo et al. |
| 2010/0270235 | A1 | 10/2010 | Santamaria et al. |
| 2014/0270972 | A1 | 9/2014 | Siewert |
| 2016/0023718 | A1* | 1/2016 | Siewert ................... B63B 71/00 29/403.1 |

* cited by examiner

*Primary Examiner* — Stephen P Avila
(74) *Attorney, Agent, or Firm* — Procopio, Cory, Hargreaves & Savitch LLP

(57) ABSTRACT

Example implementations include a system and method of using plastic from bodies of water and creating a floating platform by collecting plastic from a body of water, cleaning the collected plastic, melting and compacting the plastic, molding a plurality of hexagonal blocks from the compacted plastic, stacking the plurality of hexagonal blocks, wherein a system of springs and an energy storage device is provided between each of the plurality of hexagonal blocks, and coating the stacked blocks with a non-toxic material. Through the use of various onboard functionalities, energy may be generated to regulate temperature and provide electricity, oxygen may be supplied, and water may be purified.

13 Claims, 4 Drawing Sheets

Related Art Implementation

USING PLASTIC TO CREATE A FLOATING PLATFORM

CROSS-REFERENCE TO RELATED APPLICATION(S)

This application is a continuation of U.S. patent application Ser. No. 16/997,620, filed on Aug. 19, 2020, now U.S. Pat. No. 11,447,214, which claims the benefit of U.S. Patent Application No. 62/890,261, filed Aug. 22, 2019, the disclosure of which is hereby incorporated by reference in its entirety.

BACKGROUND

Field

The present disclosure relates to floating platforms, and more specifically, to systems and methods of using plastic from bodies of water and creating a floating platform.

Related Art

In related art implementations, solar-powered drone ships may be used to collect plastic. However, these ships are expensive. Further, the collected plastic may be transported to a recycling facility to then be recycled or disposed. Thus, the process, while necessary, may become costly to operate on a global scale. In other related art implementations, floating islands, as shown in FIG. 1, have been envisioned. However, the current structures may be massive in size, and resources have to be shipped from the land, with massive costs of operations.

SUMMARY OF THE DISCLOSURE

Aspects of the present disclosure include a floating platform comprising a plurality of hexagonal blocks made from compressed plastic collected from a body of water, a non-toxic coating covering the plurality of hexagonal blocks, a system of springs coupled to an energy storage system, wherein the system of springs are located between each block comprising the plurality of hexagonal blocks, a plant cultivation system located at the bottom of each block comprising the plurality of hexagonal blocks, a photoelectric coating covering the top and sides of each floating platform, and a computer configured to control a direction and speed of travel, determine an optimal path of travel, and control a plastic collector and plastic compactor for compressing the plastic collected from the body of water.

Other aspects of the present disclosure include a method of manufacturing a floating platform, the method comprising collecting plastic from a body of water, cleaning the collected plastic, melting and/or compacting the plastic, molding a plurality of hexagonal blocks from the compacted plastic, stacking the plurality of hexagonal blocks, wherein a system of springs and an energy storage device is provided between each of the plurality of hexagonal blocks, and coating the stacked blocks with a non-toxic material.

DETAILED DESCRIPTION

Figure 1:
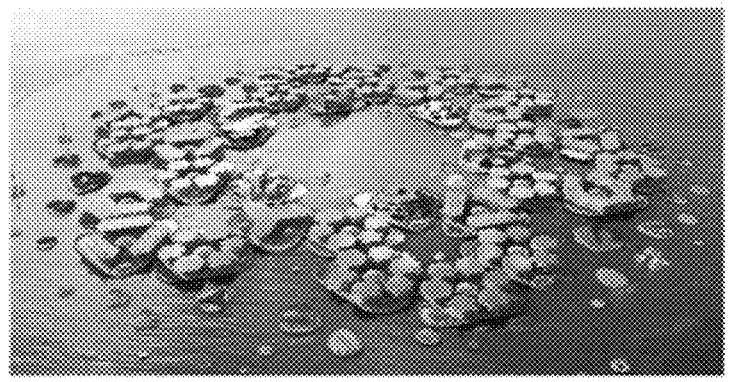
FIG. 1 illustrates a related art implementation of a floating structure.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

Plastic in oceans has now become one of the biggest problems humanity is facing. Research has shown that all fish caught now contain plastic in the stomach due to consumption. Furthermore, floating plastic has even been found in small pieces in mountains, which was likely transported via water evaporation from the oceans and wind.

It is currently estimated that floating plastic represents around 30% of the plastic in the oceans, while the remaining 70% is now on the ocean floor. The plastic on the ocean floor may be partially consumed by fungi that live at certain depths.

Figure 2:
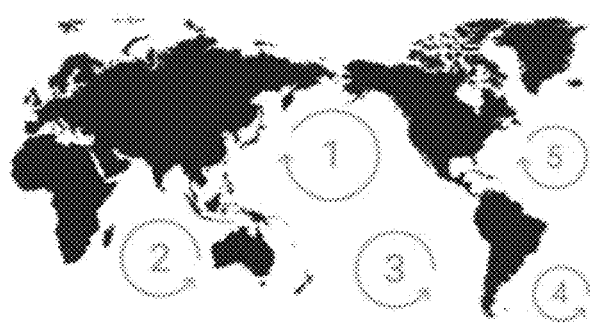
FIG. 2 illustrates a diagram showing macro areas of plastic accumulation.

There are currently 5 macro areas where plastic has accumulated, and follows the flow of current. These areas are illustrated in FIG. 2. The macro area of the Pacific Ocean may be referred to as the Great Garbage Patch, with garbage originating from the Pacific Rim (e.g., Asia, North America, and South America).

Most of the plastic does not appear in satellite images because the density of plastic at the present moment is around four pieces of plastic per square meter in these "islands". However, the pieces of plastic currently may not form an island visible from above, except for in particular situations near the coasts, because the plastic remains on the surface of the water. This behavior may be because the density of plastic is not high enough to cause the plastic to submerge beyond sea level.

In order to effectively utilize the plastic while reducing some of the negative effects identified above, a method for using plastic in the water for creating a floating platform is described herein. The method may involve the creation of two special vehicles, as well as a floating central system.

One type of vehicle, hereinafter referred to as the "Type 1 Vehicle", may have a plastic collection system contained therein. The second vehicle, hereinafter referred to as a "drone ship", may automatically transport plastic to a floating collection point, and not to the coast, in an optimized manner.

The collection system may collect plastic and clean the collected plastic. Thus, in this configuration, it is possible to collect plastic in the water itself, without needing to haul plastic back to the coast for further processing.

Big data and machine learning may help optimize paths, in order to reduce the journey traveled by the vehicle, the number of means of transport necessary, and the cost of obtaining the material. A computer may be provided with the platforms in order to provide for this functionality, as well as to control the plastic compacting process.

Figure 3:
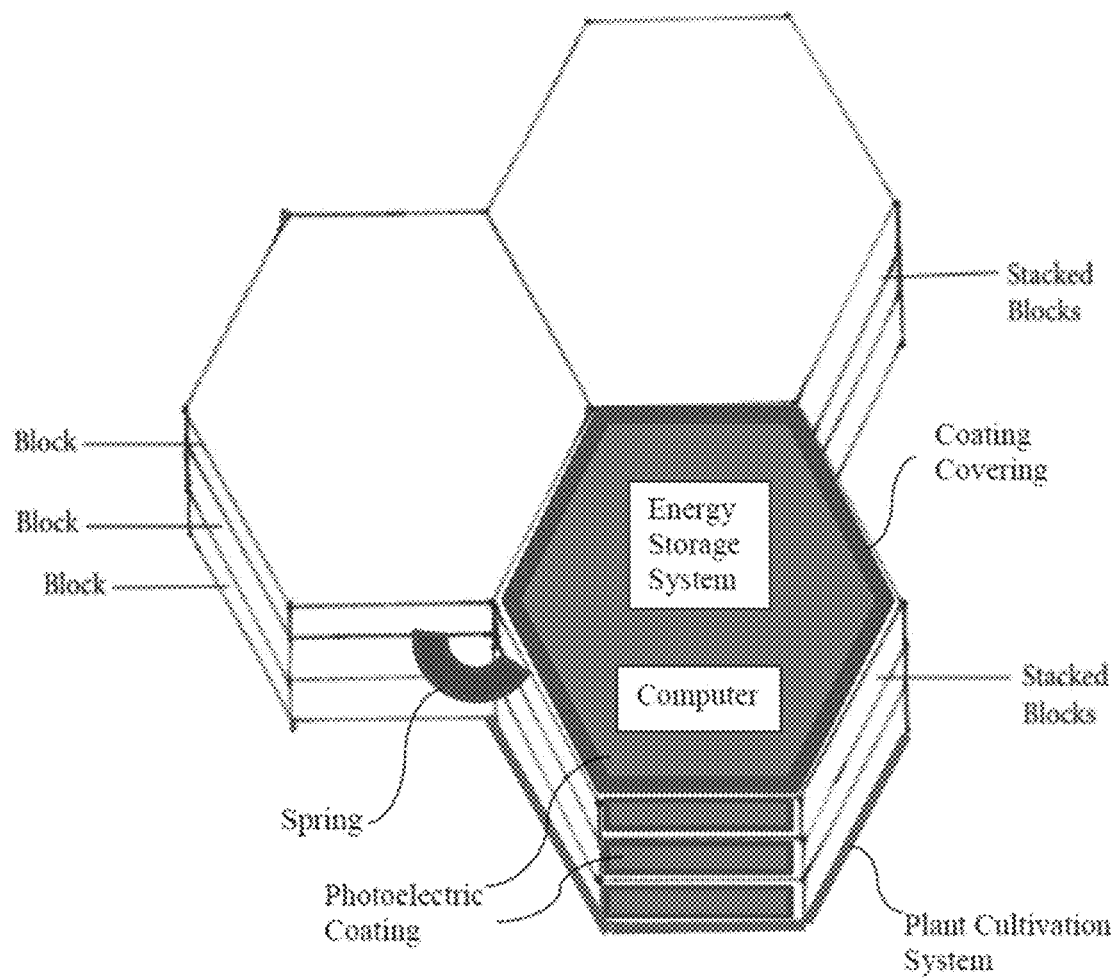
FIG. 3 illustrates a group of floating structures, according to an example implementation.

At the central collection point, instead of separating plastic form the remaining garbage and melting it as may happen in a traditional recycling center, a plastic compactor may be provided. The plastic may then be attached, making the plastic pieces a solid of various shapes and sizes as needed (e.g., blocks shown in FIG. 3). Thus, the amount of energy required for processing the plastic may be greatly reduced, as compared to a differentiator and a plastic melting furnace.

In addition to the blocks, other objects and infrastructure may be created with the collected plastic.

Each compressed block of plastic may be covered with a non-perishable film resistant to some of the damaging effects of seawater, in order to prevent dispersion of plastic molecules in the body of water. This film may also be non-toxic and non-polluting.

By reducing the plastic surface exposed to water in compressed blocks as compared to single pieces or plastic veils, the phenomenon of pollution given by the dissolution of plastic may be drastically reduced by over 99%.

A primary solid block called a Prisma may be used, which may contain a system on the lateral sides of the block to interlock with other similar prisms. These solid blocks may be interconnected to create a hexagonal shape similar to that of a beehive, to create an overall floating, multilayer surface (shown in FIG. 3).

The system of hexagons may also be designed to allow for easy extraction from the bottom upwards, so as to be able to easily perform maintenance on each block.

The floating blocks may be buoyant so that they float on top of the water.

The central compression system may be designed to be as efficient as possible from the point of view of energy consumed, so that it can be independent of land and transport fuels. In other words, the central compression system may be fully self-sustainable by design by implementing one or more energy efficient techniques.

In order to be fully self-sustainable, two primary power systems may be utilized. One system may be solar power. The other system may use the movement of marine waves to generate energy.

For the solar energy, the surfaces of the hexagon blocks may be coated with a photoelectric material.

For the movement of marine waves, the hexagonal blocks may be stackable. Between each layer of blocks, a system of springs may be installed to generate energy caused by the movement of the body of water. Further, while generating energy, the springs may reduce the oscillation of the surface. The springs may be easily replaceable so as to enable easy maintenance.

Energy can be obtained also by leveraging the ups and down movement of two near hexagon generated by the wave movement.

The energy may be collected and stored in an energy storage device for future use. This energy storage device may be any device known to one having ordinary skill in the art.

Further, other similar electromechanical systems known to ones having ordinary skill in the art may be implemented to generate and store energy created by the motion of the body of water.

The generated energy may be used to help regulate temperature and provide electricity to the blocks. The energy may further be utilized to operate desalination plants, in order to make the blocks self-sufficient in terms of fresh water supply.

The desalination plants may be based on the use of special membranes known to those having ordinary skill in the art, using both currents from the body of water and the energy generated by the blocks for power and input resources.

The blocks may also include "rivers" by having concentric circles of water that is let in to the block to reduce lateral pressure, and to create a lagoon effect. This configuration is similar to that as the lagoon effect in the Venice Peninsula.

Bridges between separated blocks may absorb lateral pressure, and in turn generate electricity through the spring mechanism or other electromechanical mechanism as described above. The bridges connecting the platforms may be positioned at a particular distance to optimize the solidity of the structure.

The bottom surfaces of the blocks may be covered with algae, kelp, seaweed, and/or other marine plants that produce oxygen. The top surfaces of the areas of the blocks covering the plants may be covered with plates suitable for the climate in which the block may be stationed. The plants may further be covered by a greenhouse within the block.

The roots of the plants may further provide structural strength at necessary points. Additionally, other plants such as fruit-producing plants or vegetables may be grown on the blocks.

Within the blocks, systems of water filters, fishing, and sustainable plant cultivation may be carried out, in order to provide a high level of sustainability. In this manner, outside support may not be required.

Through the above-identified functionalities, human life may be supported with access to heat, electricity, oxygen, food, and clean water.

The blocks may also be formed around dismantled oil platforms, which may function as an anchoring system.

While the above implementations describe systems in international waters, the blocks may also be located near a coast while still in international waters. The generated blocks may be given to a nation owning the international water area in concession for the achievement of projects for humanitarian purposes, and for the purpose of sustainable business.

Management of the population may be foreseen through authorizations linked to the objectives of the projects built upon the blocks.

Figure 4:
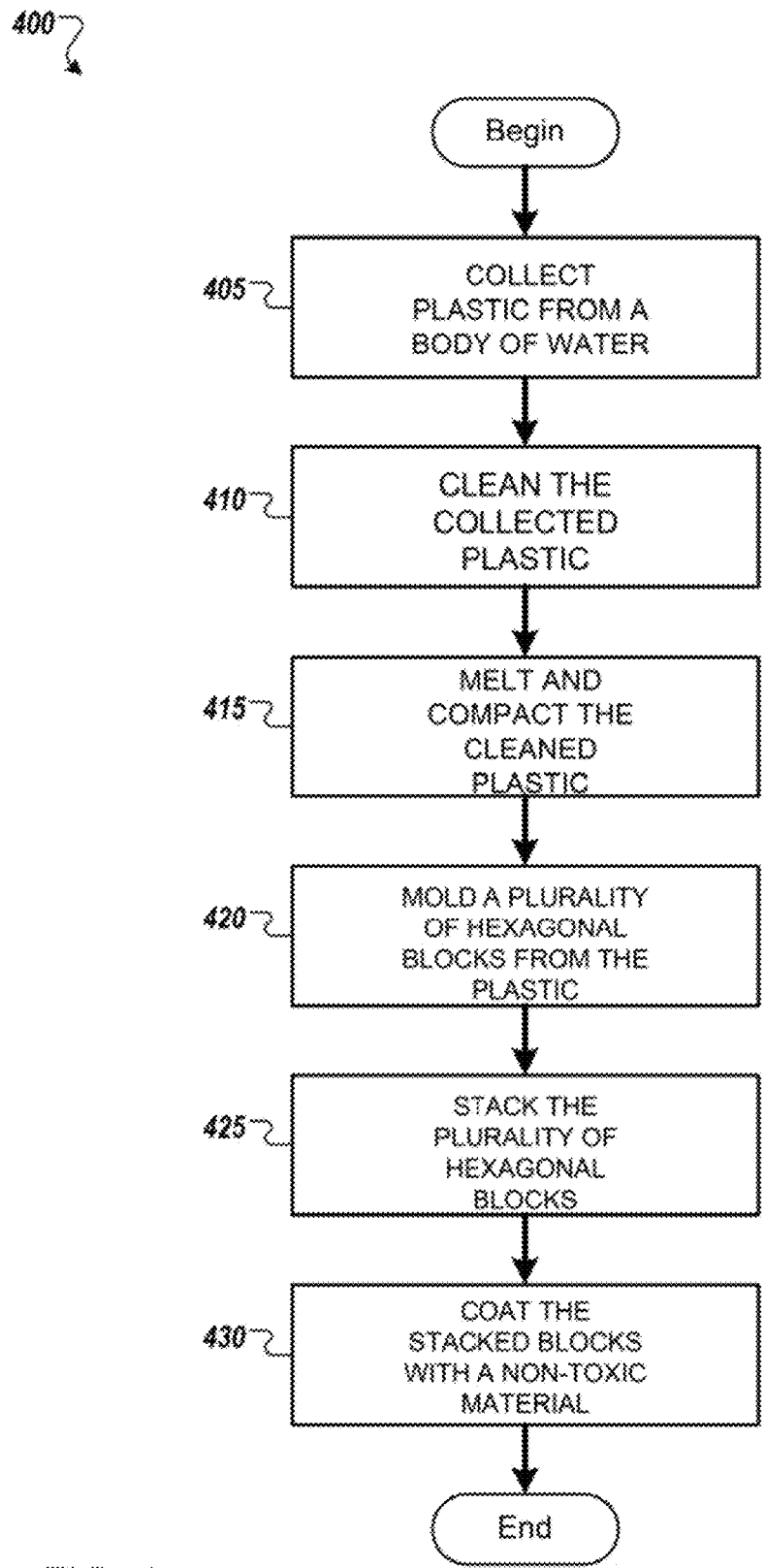
FIG. 4 illustrates a process for creating a floating structure, according to an example implementation.

A method for creating the formed platforms is described with respect to FIG. 4. In method 400, a plastic collector may collect plastic from a body of water at 405. Then, the plastic may be cleaned at 410. Once the plastic is cleaned, the plastic may be melted and/or compacted at 415. From this compacted plastic, a plurality of hexagonal blocks may be formed at 420.

The plurality of hexagonal blocks may then be stacked at 425, while providing a system of springs and energy storage device(s) between each layer of the plurality of hexagonal blocks (e.g., between each hexagonal block). Other electromechanical systems known to ones having ordinary skill in the art may be implemented to serve the purpose of collecting energy based on motion.

Once the plurality of blocks are stacked, the stacked blocks may be coated with a non-toxic material at 430.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A floating platform comprising:
   a plurality of blocks made from compressed plastic collected from a body of water;
   a coating material covering the plurality of blocks;
   a spring coupled to an energy storage system, the spring being located between each block of the plurality of blocks;
   a plant cultivation system located on the plurality of blocks;
   a photoelectric coating covering the floating platform; and
   a computer configured to:
      control a direction and speed of travel of the floating platform;
      determine an optimal path of travel of the floating platform; and
      control drones and a compactor for compressing debris collected from a body of water.

2. A method of manufacturing a floating platform, the method comprising:
   collecting debris from a body of water;
   cleaning the collected debris;
   melting and compacting the debris;
   molding a plurality of blocks from the compacted debris;
   stacking the plurality of blocks, a spring and an energy storage device being provided between each of the plurality of blocks; and
   coating the stacked blocks with a coating material.

3. The floating platform according to claim 1, wherein the blocks have a hexagonal shape.

4. The floating platform according to claim 1, wherein the coating material is non-toxic.

5. The floating platform according to claim 1, wherein the plant cultivation system is located on said each block.

6. The floating platform according to claim 1, wherein the plant cultivation system is located on a bottom surface of said each block.

7. The floating platform according to claim 1, wherein the photoelectric coating covers a top surface and side surfaces of the floating platform.

8. The floating platform according to claim 1, wherein the drones comprise plastic collector devices and the debris comprise plastics.

9. The floating platform according to claim 1, wherein the drones comprise plastics collector devices.

10. The floating platform according to claim 1, wherein the debris collected from the body of water comprise plastics.

11. The method according to claim 2, wherein the debris comprise plastics.

12. The method according to claim 2, wherein the block have a hexagonal shape.

13. The method according to claim 2, wherein the coating material is non-toxic.

* * * * *